UNITED STATES PATENT OFFICE.

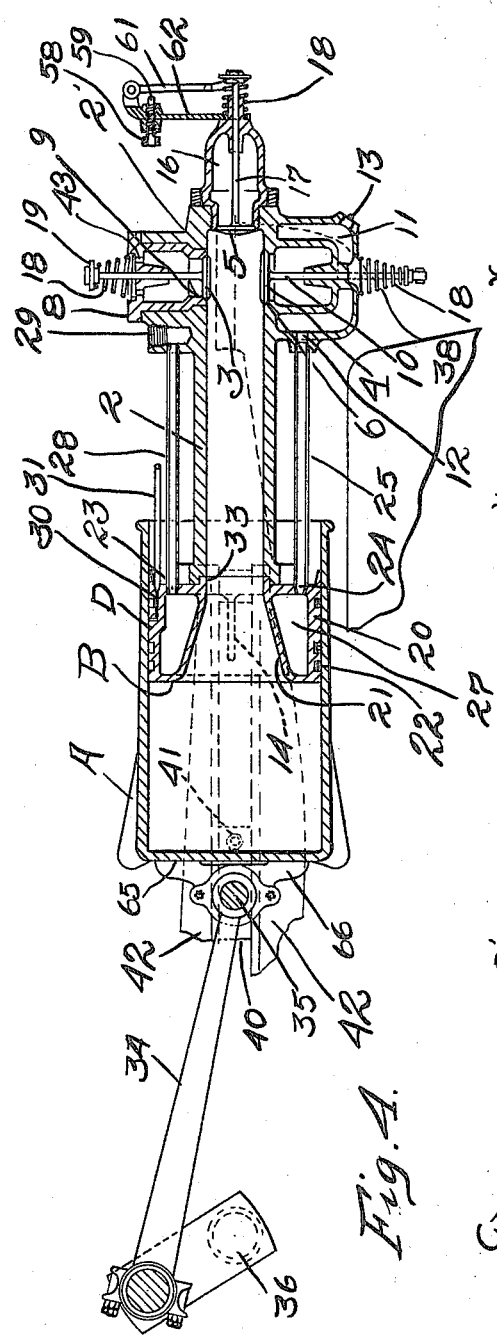
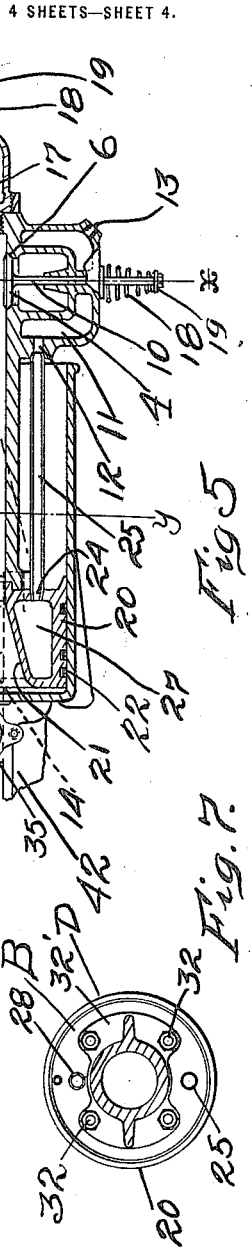
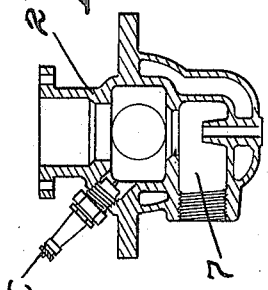

WILLIAM A. SORG, OF MINNEAPOLIS, MINNESOTA, ASSIGNOR, BY MESNE ASSIGNMENTS, TO FREDERICK G. BRADBURY, TRUSTEE, OF DULUTH, MINNESOTA.

COMBUSTION-ENGINE.

1,161,353.  Specification of Letters Patent.  Patented Nov. 23, 1915.

Application filed March 2, 1914. Serial No. 821,908.

*To all whom it may concern:*

Be it known that I, WILLIAM A. SORG, a citizen of the United States, residing at Minneapolis, in the county of Hennepin and State of Minnesota, have invented a new and useful Improvement in Combustion-Engines, of which the following is a specification.

An object of this invention is to provide a combustion engine in which the fuel employed is isolated from the piston and bearing surfaces between the piston and cylinder thereby preventing sulfur and other impurities in the fuel from depositing on said piston and bearing surfaces.

Another object is to provide a positive cooling system for the parts of the structure.

Another object is to exert a constant force against the piston during the working stroke instead of employing a sharp impact which results in other devices from an explosion of the fuel.

Another object is to produce complete vaporization of the fuel and especially of heavy oil such as kerosene and crude petroleum and of alcohol.

Another object is to control the rate of burning of the fuel in the engine.

Another object is to provide in combination with a hot tube for vaporizing the fuel, a cool bearing surface for the piston to reciprocate upon whereby the working surfaces may be effectively lubricated.

A still further object is to provide a structure in which the tube and bearing element may be easily assembled or separated to replace one of said parts.

These and further objects will be apparent from the following description. As a result a highly efficient and economical engine is produced.

Figure 1:
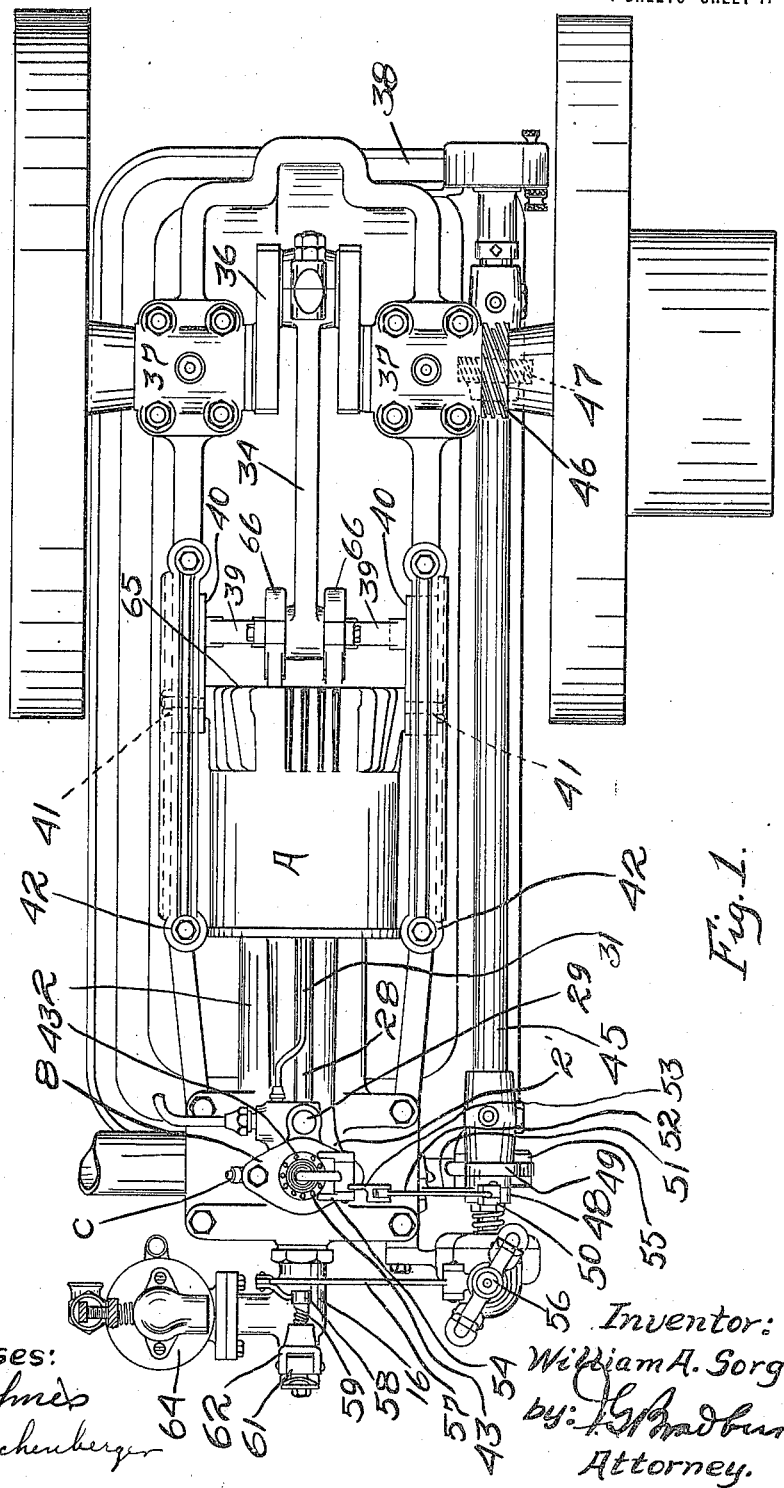
Figure 2:
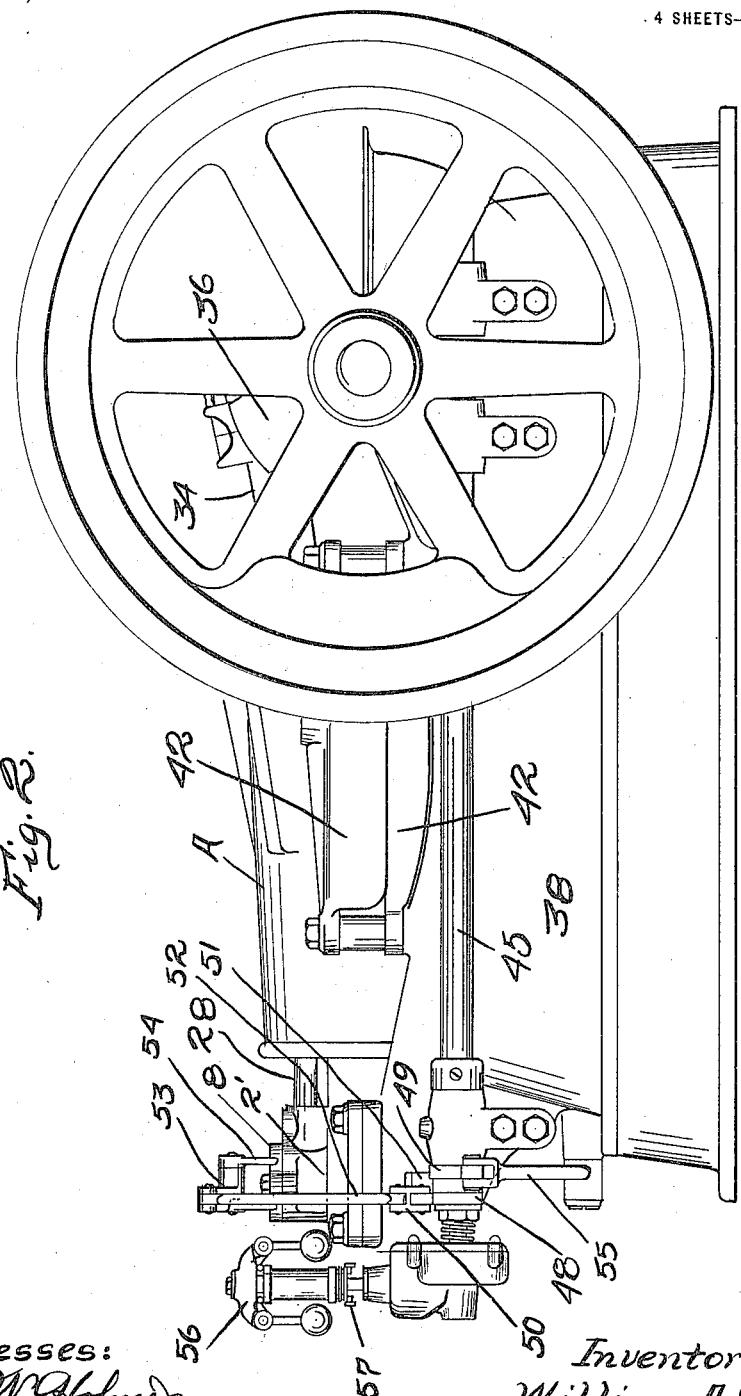
Figure 3:
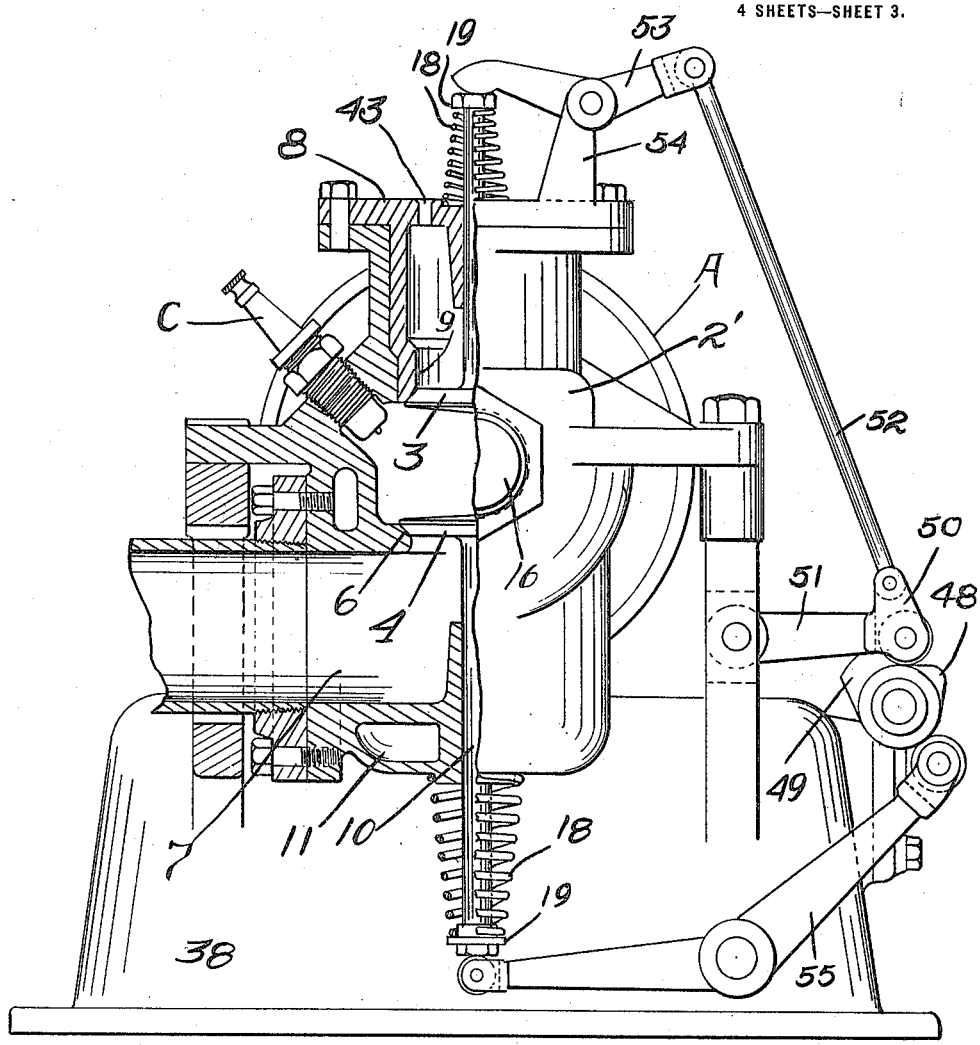

In the accompanying drawings illustrating my invention and forming part of this specification, Figure 1 is a plan; Fig. 2 is a side elevation; Fig. 3 is an end elevation, part of the mechanism being broken away and in section; Fig. 4 is a longitudinal central section when the reciprocable member is nearing the outer portion of a stroke; Fig. 5 is a longitudinal central section when the reciprocable member is at the inner portion of a stroke; Fig. 6 is a vertical cross section of the valve casing with valves removed and taken on line X—X, Fig. 5, and Fig. 7 is a section taken on the line Y—Y, Fig. 5.

In the drawings, A indicates a piston or reciprocable member and B a cylinder or stationary member, which co-acts with the reciprocable member and in which the fuel is adapted to be vaporized and formed in a long column to be ignited near one end by the positively operable igniter C of usual construction. The cylinder is formed by a long tube 2 extending longitudinally on the axis of the piston, at the outer end of which is formed suitable valve casings 2' provided with oppositely disposed valves 3 and 4 in its side respectively for the admission of air and the exhaust of a spent charge. Extending longitudinally on the axis of the cylinder at its outer end is a valve 5, which is adapted to admit fuel such as kerosene, gasolene, crude petroleum or alcohol into the end of the tube. These valves 3, 4 and 5 are puppet valves or valves of any suitable design and of usual construction, the valve 4 being seated directly upon the valve seat 6 inside of the tube and adapted to open and close the exhaust passage 7. The opposite air ingress valve 3 is seated in a suitable cage 8 and controls the opening and closing of the air ingress passage 9, said cage entering an opening in the side wall of the combustion chamber tube and being of sufficient diameter to allow the placing of the valve 4 on its seat with its stem 10 projecting outwardly through the head of one of valve casings 2'. That portion of the casing 2' surrounding the exhaust valve is formed with a cooling chamber 11 having passages 12 and 13 through which a cooling medium such as water can be circulated. The fuel ingress valve 5 controls the admission of fuel into the end of the tube and is seated in a manifold or cage 16, said manifold being detachably mounted upon one of the casings 2' by threaded connection. The valve 5 also has a stem 17 projecting outwardly through the wall of said manifold. All of the valves are held closed under spring pressure by the coil springs 18, each of which is held compressed below a head piece 19 detachably secured on the outer end of each of the stems in the usual manner. The inner end of the tube forming part of the combustion chamber is provided with a bearing element D which is positively cooled leaving the tube 2 to be heated by heat emitted through the combustion of fuel therein and providing an inner hot surface which is adapted to most effectively vaporize heavy fuel oils.

The bearing element D is detachably mounted upon the inner end of the tube and is formed with a cylindrical outer wall 20 and an inwardly tapering longitudinal passage 21 in extension of the chamber in the tube 2. The passage 21 is favorably flared outwardly to prevent eddy currents in the combustion chamber. The cylindrical wall 20 of the bearing D is provided with packing rings 22 to form a gas tight connection with the reciprocating member A. The bearing element D is chambered for the purpose of circulating a cooling medium such as water, openings 23 and 24 being provided in the exposed end of the bearing through which said water is adapted to flow. A wall 14 part way across the chamber in the bearing acts as a weir to direct the flow of cooling medium and cause the liquid to uniformly and positively circulate. The bearing element D and the head end of the tube in which the valves are seated are connected by tubes 25 and 28. The cooling medium is admitted through port 13, into the jacket surrounding the exhaust valve and thence passes outward through passage 12, through tube 25, port 24, chamber 27 in the bearing element around weir 14, through port 23, tube 28 and port opening 29 in the upper portion of one of the casings 2' on the head end of the tube. By this means the exhaust valve is cooled to prevent warping and the bearing element is also cooled to provide when oiled, an efficiently lubricated bearing for the reciprocable element. A duct 30 in the wall of the bearing leading from a supply tube 31 conducts lubricating oil between the bearing surfaces of the bearing element and reciprocable member. The bearing element is secured upon the outer end of the tube by stud bolts 32 passing through a flange 32' on the tube and presses a circular shoulder 33 on the inner end of the bearing element, securely and tightly seated in the inner end of the tube 2, and the tubes 25 and 28 with their ends tightly swaged into part of the casings 2' on the tube 2 and the exposed end of the bearing element.

The reciprocable member is in the form of a hollow cylinder having a closed end 65, said closed end being formed with a pair of bosses 66 between which the pitman 34 is journaled upon the pin 35. The free end of the pitman is connected to the crank shaft 36 which is journaled upon suitable bearings 37 supported by the bed 38 which also carries the tube 2 and the parts mounted upon the tube. The pair of bosses 66 carry a pair of laterally extending supports 39, the outer ends of which are mounted upon cross head blocks 40, said blocks being rigidly secured to said supports 39 and to the side of the piston or reciprocable element A by bolts 41. These cross head blocks 40 are adapted to slide longitudinally in a pair of parallel guide bearings 42. By this construction the reciprocable element is guided longitudinally on the bearing element D.

The valves 3, 4 and 5 are opened and closed by suitable valve mechanism hereinafter described, the valve 3 being opened so as to admit air through the passage 9 and perforations 43 in the cage 8 into the outer end of the tube 2, during the early part of the suction stroke of the reciprocable element. After the valve 3 closes and during the remaining part of the suction stroke fuel is admitted and mixes with part of the air previously admitted through valve 3 and the fuel while in the form of a stratum assumes a position adjacent the head or valve end of the tube, causing any inert gas remaining from a previous stroke of the reciprocable element to assume a position adjacent the inner end of the tube next to the reciprocable element and the air to assume a position between the stratum of inert gas and the stratum of fuel. Thus the fuel air and inert gas are formed in separate strata with the rich fuel mixture in position to be fired by the positively timed electric igniter C, which is positioned in the wall of the head end of the tube near the valves. During the compression stroke of the reciprocable element the fuel mixture, air and inert gas remain in separate strata being compressed substantially wholly within the tube which has previously been heated through the combustion of fuel therein. The hot tube assists in vaporizing the fuel and causing it to burn when ignited most efficiently. Particularly is this true in connection with fuel composed of a mixture of air and kerosene or other comparatively heavy oils. At the end of the compression stroke the fuel charge in the tube is ignited near one end and burns progressively causing a continuous force to be exerted by the expanding air and gases in the combustion chamber during the entire working stroke of the reciprocable member. At the end of the working stroke the exhaust valve 4 is opened and the return or scavenging stroke of the reciprocable member forces the spent gases out through the exhaust passage. During the working stroke any heavy particles of the fuel not consumed remain in the tube and are subsequently carried out during the scavenging stroke thus not coming into contact with the bearing surfaces of the piston and cylinder. This cycle of operation repeats itself as long as the engine is in operation.

The valves are opened and closed in a manner to accomplish the operation just stated by suitable valve mechanism of ordinary construction consisting of the following parts. A counter shaft 45 is journaled upon the base 38 and driven at suitable speed by the crank shaft 36 through intermeshing screw gears 46 and 47. A pair of cams 48 and 49 are carried by the shaft, the cam 48 being adapted to trip the cam lever 50 journaled on the bracket 51 and connected by the rod 52 to the walking beam 53 to tilt said beam on its support 54 and depressing the air puppet valve 3, and the cam 49 tilting the walking beam 55 which is journaled upon the base and causing it to depress and open the exhaust puppet valve 4. The fuel valve 5 is opened and closed in synchronism with the operation of the other valves and caused to admit fuel in direct proportion to the load carried by the engine and cause the reciprocable member to operate at an even speed irrespective of the amount of load.

The opening of the valve 5 is automatic through the suction of the reciprocable element when the valves 3 and 4 are closed. When the valve 3 is open the free admission of air into the combustion chamber reduces the force of suction below that which will open the valve 5 and in consequence the fuel is not admitted into the combustion chamber when the valve 3 is open. The strength of the springs which close the valves 3 and 5 is proportioned to cause this operation of the valves, the spring on valve 5 being weaker than the spring on valve 3. The amount of fuel admitted by the valve 5 is entirely governed automatically by the governor 56 which through its connection by the rod 57 and lever 58 carrying a screw 59, turns the screw 59 sufficiently to regulate the position of its end. The screw 59 acts as a stop to limit the throw of a swinging arm 61 which is pivoted upon a support 62 mounted upon the manifold casing 16, the free end of said arm being interposed in the path of the movement of the head end 19 on the stem 17 of the valve 5, so as to regulate the amount of opening of the valve according to the speed of the governor. The manifold casing 16 is shown connected with a carbureter such as 64 of usual type which is connected with a source of fuel supply not shown.

It is not necessary to employ a carbureter because any form of mixer can be employed in connection with the manifold or the mixing of the fuel with air can be done in the tube without the use of a carbureter or mixer.

In accordance with the patent statutes I have described the principles of operation of my invention together with the apparatus which I now consider to represent the best embodiment thereof, but I desire to have it understood that the construction shown is only illustrative and that the invention can be carried out by other means and applied to uses other than those above set forth within the scope of the following claims.

Having described my invention, what I claim as new and desire to protect by Letters Patent is:—

1. A combustion engine, comprising, in combination, a piston and cylinder in reciprocable connection, said cylinder consisting of a long tube having a bore of materially less diameter than that of said piston and having valved ports in its outer end through which air and fuel are admitted in separate strata in said tube and spent gases are adapted to be exhausted and a piston bearing element separably mounted upon the inner end of said tube and upon which said piston is slidably mounted, the chamber in said bearing having ingress and egress ports for circulating cooling medium through said chamber to cool said bearing whereby the bearing is kept cold as compared with the temperature of the tube and means for igniting the stratum of fuel in said tube whereby said tube is heated to assist in efficiently vaporizing the fuel.

2. A combustion engine, comprising, in combination, piston and cylinder elements in reciprocable connection, said cylinder element having a long tubular combustion chamber valved to admit air and fuel in succession and exhaust spent gases, the inner diameter of said tubular structure being materially less than the diameter of the working space of said piston whereby the contents of said working space and the mixture charge in said tubular chamber are prevented from mixing before ignition, said cylinder member also having a chambered bearing upon said tubular structure, on which said reciprocable member is slidably mounted, the chamber in said bearing being passaged to circulate cooling medium through said bearing.

3. A combustion engine, comprising, in combination, piston and cylinder elements in reciprocable connection, said cylinder element being formed by a long tubular structure and a chambered bearing upon which said reciprocable member is slidably mounted, the chamber in said bearing being passaged to circulate cooling medium through said bearing and said bearing being detachably mounted on an end of said tubular structure and having a passage therethrough coöperating with the chamber in said tubular structure to form a combustion chamber, the outer end of said tubular structure being provided with fuel ingress and exhaust valved passages and the side of said tubular structure having a valved ingress passage adapted to admit air into the combustion chamber in advance of the admission of fuel whereby the air and fuel admitted are formed in separate strata in the combustion chamber and means for igniting the stratum of fuel near one end of said tubular structure whereby the charge is adapted to burn gradually and exert a relatively prolonged even force against the piston element.

4. A combustion engine, comprising, in combination, a piston and cylinder in reciprocable connection, one of said members being formed with a long tubular combustion chamber valved to admit air and fuel and exhaust spent gases and adapted to contain substantially the entire fuel charge before ignition and during the working stroke, the inner diameter of said chamber being materially less than the inner diameter of the other coöperating element, and a hollow bearing detachably mounted upon one end of said tubular structure and upon which said piston is slidably mounted, said bearing having ports connected with and a weir partition across its interior space for circulating cooling medium through said space, and being formed with a longitudinal passage in extension of the longitudinal passage in said tubular structure.

5. A combustion engine, comprising, in combination, a piston and cylinder in reciprocable connection, said cylinder comprising a long tube having a bore of materially less diameter than the outer diameter of the piston and a bearing detachably mounted upon one end of said tube and having a passage in extension of the longitudinal passage in said tube and with said tube forming a combustion chamber, said bearing being chambered to circulate cooling medium therethrough and having sliding connection with said piston, the free end of said tube being provided with a valved passage adapted to admit air into said tube during the early portion of the suction stroke of the piston, a valved passage adapted to admit fuel into said tube during the latter part of the suction stroke of said piston, whereby said air and fuel are formed in separate strata in said combustion chamber and a valved passage adapted to exhaust spent gases from the combustion chamber after the working stroke of the piston and means for igniting the fuel near one end of said tube whereby the fuel is controlled and adapted to exert a relatively prolonged even pressure against the piston during the working stroke.

6. A combustion engine, comprising, in combination, a piston and cylinder in reciprocable connection, said cylinder consisting of a bearing element passaged longitudinally and chambered to circulate cooling medium therethrough and a tube extending longitudinally from one end of said bearing, means for detachably securing said tube on said bearing, the free end of said tube being provided with valved air ingress and exhaust passages in its side wall, means for opening said air inlet valve so that air is admitted into said tube in a constant quantity to avoid changes in compression when the engine is throttled, an automatic fuel ingress valve in said tube adapted to admit fuel therein upon said air valve closing to produce separate strata of air and fuel in said tube previous to the ignition of fuel and a positively timed igniter in said tube adapted to ignite the rich portion of the fuel charge.

7. A combustion engine, comprising, in combination, a piston and cylinder in reciprocable connection, the latter being formed with a long tubular combustion chamber, the bore of which is of materially less diameter than the diameter of said piston, said tube having on its outer end air, fuel and exhaust valved passages adapted to admit a stratum of air and a stratum of fuel in said tube, so as to remain in separata strata, the heavy particles of the fuel being retained in said tube until the fuel is consumed and means for igniting the fuel at one end of the tube whereby a prolonged even force is exerted against said piston during the working stroke.

In testimony whereof, I have signed my name to this specification, in the presence of two subscribing witnesses.

WILLIAM A. SORG.

Witnesses:
STELLA L. WASCHENBERGER,
F. G. BRADBURY.

Copies of this patent may be obtained for five cents each, by addressing the "Commissioner of Patents, Washington, D. C."